(12) United States Patent
Shibata (10) Patent No.: US 8,164,847 B2
(45) Date of Patent: Apr. 24, 2012

(54) FALL DETECTION DEVICE, MAGNETIC DISK DEVICE, AND PORTABLE ELECTRONIC APPARATUS

(75) Inventor: Akihiko Shibata, Kanagawa-ken (JP)

(73) Assignee: Murata Manufacturing Co., Ltd. (JP)

( * ) Notice: Subject to any disclaimer, the term of this patent is extended or adjusted under 35 U.S.C. 154(b) by 102 days.

(21) Appl. No.: 12/628,196

(22) Filed: Nov. 30, 2009

(65) Prior Publication Data

US 2010/0073812 A1    Mar. 25, 2010

Related U.S. Application Data

(63) Continuation of application No. PCT/JP2008/059546, filed on May 23, 2008.

(30) Foreign Application Priority Data

Jun. 5, 2007   (JP) .................................. 2007-149053

(51) Int. Cl.
    *G11B 19/04*     (2006.01)
(52) U.S. Cl. ........................................ 360/75
(58) Field of Classification Search ................. None
    See application file for complete search history.

(56) References Cited

U.S. PATENT DOCUMENTS

| | | | | |
|---|---|---|---|---|
| 5,835,298 | A * | 11/1998 | Edgerton et al. ................. | 360/75 |
| 5,982,573 | A * | 11/1999 | Henze ............................. | 360/75 |
| 6,046,877 | A * | 4/2000 | Kelsic ............................. | 360/75 |
| 6,738,214 | B2 * | 5/2004 | Ishiyama et al. ................. | 360/75 |
| 7,042,663 | B2 * | 5/2006 | Shimotono et al. .............. | 360/75 |
| 7,190,540 | B2 * | 3/2007 | Matsumoto ...................... | 360/75 |
| 7,191,089 | B2 * | 3/2007 | Clifford et al. ................. | 702/141 |
| 7,328,615 | B2 * | 2/2008 | Kwon et al. ...................... | 73/488 |
| 7,369,345 | B1 * | 5/2008 | Li et al. ............................ | 360/75 |
| 7,382,563 | B2 * | 6/2008 | Saitoh et al. ..................... | 360/60 |
| 7,382,567 | B2 * | 6/2008 | Liao et al. ......................... | 360/75 |

(Continued)

FOREIGN PATENT DOCUMENTS

JP    2000-241442 A    9/2000

(Continued)

OTHER PUBLICATIONS

International Search Report; PCT/JP2008/059546; Jun. 24, 2008.

(Continued)

*Primary Examiner* — Will J Klimowicz
*Assistant Examiner* — James L Habermehl
(74) *Attorney, Agent, or Firm* — Studebaker & Brackett PC; Tim L. Brackett, Jr.; John F. Guay (57) ABSTRACT

By detecting that a differentiation value of the absolute value of acceleration is lower than a negative threshold value DAth1 in a negative direction from a first stage (S1: Stationary state) where the differentiation value of the absolute value of acceleration is approximately 0, it is considered that the stage is in a second stage (S2: Fall start state). When the absolute value of acceleration after that has become lower from a threshold value Ath1, it is considered that the fall detection device has entered a third stage (S3: Low gravity state). When the low gravity state has continued for a given time T3, it is considered that the stage is in a fourth stage (S4: Falling state), and a fall detection signal is output. Thus, the processing load when the determination is performed by software is reduced and the prediction of a fall can be performed.

4 Claims, 8 Drawing Sheets

U.S. PATENT DOCUMENTS

| | | | |
|---|---|---|---|
| 7,450,332 B2 * | 11/2008 | Pasolini et al. | 360/75 |
| 7,496,470 B2 * | 2/2009 | Nakamura et al. | 702/141 |
| 7,549,335 B2 * | 6/2009 | Inoue et al. | 360/75 |
| 7,551,388 B2 * | 6/2009 | Horiguchi et al. | 360/75 |
| 7,690,253 B2 * | 4/2010 | Noda et al. | 360/75 |
| 7,751,142 B2 * | 7/2010 | Karakas | 360/75 |
| 2007/0030159 A1 * | 2/2007 | Stoev et al. | 340/669 |

FOREIGN PATENT DOCUMENTS

| | | |
|---|---|---|
| JP | 3441668 B2 | 9/2003 |
| JP | 2005-147899 A | 6/2005 |
| JP | 2007-095182 A | 4/2007 |
| WO | 2006-061950 A1 | 6/2006 |

OTHER PUBLICATIONS

Written Opinion of the International Search Authority; PCT/JP2008/059546; Jun. 24, 2008.

The Japanese Office Action "Notification of Reasons for Rejection" issued on Jan. 17, 2011; Japanese Patent Application No. 2009-517792 with translation.

* cited by examiner

FALL DETECTION DEVICE, MAGNETIC DISK DEVICE, AND PORTABLE ELECTRONIC APPARATUS

CROSS REFERENCE TO RELATED APPLICATIONS

The present application is a continuation of International Application No. PCT/JP2008/059546, filed May 23, 2008, which claims priority to Japanese Patent Application No. 2007-149053 filed Jun. 5, 2007, the entire contents of each of these applications being incorporated herein by reference in their entirety.

BACKGROUND OF THE INVENTION

1. Field of the Invention

The present invention relates to a fall detection device detecting, on the basis of sensing an acceleration, whether or not a device is in a falling state, and to a magnetic disk device and a portable electronic apparatus having the same.

2. Description of the Related Art

As examples of prior art, Japanese Unexamined Patent Application Publication No. 2005-147899 and Japanese Patent No. 3441668 disclose devices with detection of falling states.

Figure 1:
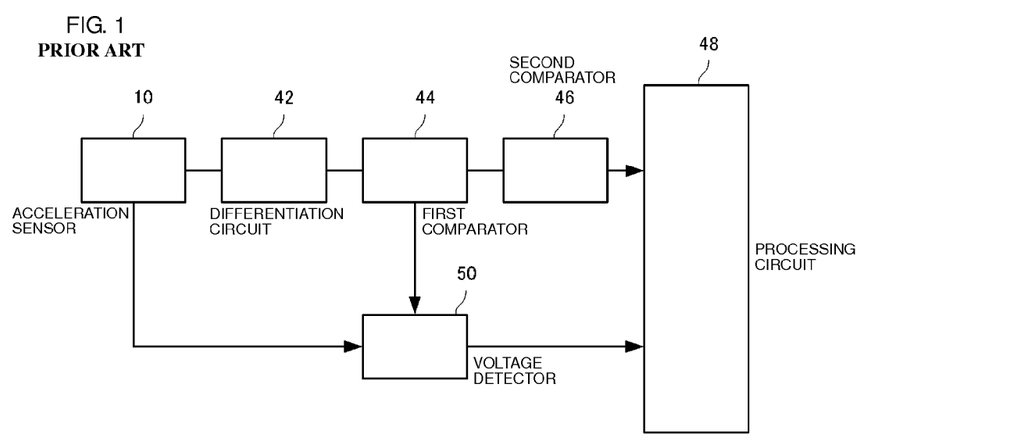
FIG. 1 is a block diagram of the structure of a fall detection device of Japanese Unexamined Patent Application Publication No. 2005-147899.

FIG. 1 illustrates the structure of the device of Japanese Unexamined Patent Application Publication No. 2005-147899. The fall detection device has an acceleration sensor 10, a differentiation circuit 42 for differentiating the acceleration detection signal and outputting a differentiation signal, a first comparator 44 for determining whether or not the differentiation signal reaches a first given threshold value, a second comparator 46 for determining whether or not the differentiation signal reaches a second given threshold value higher than the first threshold value, a voltage detector 50, and a processing circuit 48.

When an output signal of the acceleration sensor 10 reaches a predetermined set value, and the state is maintained for a given period of time, the fall detection device illustrated in FIG. 1 detects when the current state is a first processing state when the differentiation signal reaches the first threshold value. The fall detection device also detects when the current state is a second processing state when the differentiation signal reaches the second threshold value. Thus, in the first processing state, for example, a safety action is controlled to suspend a recording operation when a magnetic head of a hard disk device is recording. When detecting the second processing state, for example, the hard disk device is controlled to be in a much safer state.

The fall detection device of Japanese Patent No. 3441668 has an acceleration sensor and a fall determination processing unit and is configured such that both an acceleration and a differentiation value of the acceleration are simultaneously used for the determination.

In the fall detection device of Japanese Unexamined Patent Application Publication No. 2005-147899, it is necessary to simultaneously use two threshold values for determining whether or not a device is falling, which complicates the determination processing. Therefore, particularly when the determination is performed by software, the arithmetic load on CPU becomes large, causing a problem of prolonged processing time.

In Japanese Unexamined Patent Application Publication No. 2005-147899, although a falling state or a state where an impact has been applied can be individually determined, a state where the start of a fall is suspected (i.e., a fall prediction) cannot be detected, resulting in a problem in that a measure against the fall cannot be taken at an early stage.

In Japanese Unexamined Patent Application Publication No. 2005-147899, an acceleration is used for the determination. In general, a detected acceleration value of the acceleration sensor contains an offset, and thus an offset adjustment of the acceleration sensor is required.

When a device falls while rotating, for example, an acceleration due to the centrifugal force of the rotation is added. Thus, a detected acceleration value is likely to be influenced by the centrifugal force of the rotation. Thus, there is also a possibility that a fall is not appropriately determined when a device falls while rotating.

In the fall detection device of Japanese Patent No. 3441668, both an acceleration and a differentiation value of the acceleration are simultaneously used for the determination, and thus the determination processing is complicated. Thus, problems similarly as in the case of Japanese Unexamined Patent Application Publication No. 2005-147899 arise. Moreover, a fall cannot be predicted.

SUMMARY OF THE INVENTION

The present invention has been developed in view of the above-described problems, and it is an object of the present invention to provide a fall detection device with a reduction in processing load when a determination is performed by software in a prediction of a fall. It is further an object of the present invention to provide a magnetic disk device and a portable electronic apparatus having the same.

In order to solve the above-described problems, the fall detection device of the invention is described in various embodiments as follows:

(1) In an embodiment of a fall detection device for detecting a fall on the basis of an output signal of an acceleration sensor, the fall detection device includes:

a fall start monitoring unit for monitoring whether or not the fall detection device is in a fall start state in which a signal indicating a differentiation value of the absolute value of acceleration is lower than a given negative threshold value (from a stationary state) in a negative direction or is within a given negative range;

a low-gravity transition detection unit for detecting whether or not the fall detection device is in a period of transition or shift from the fall start state to a low gravity state in which the signal indicating the absolute value of acceleration is lower than a given threshold value or falls within a given range lower than a value of the stationary state (gravitational acceleration applying state) within a given period of time; and a falling state detection unit for detecting a falling state in which the low gravity state continues for a given period of time or longer.

(2) In another embodiment of a fall detection device for detecting a fall on the basis of an output signal of an acceleration sensor, the fall detection device includes:

a fall start monitoring unit for monitoring whether or not the fall detection device is in a fall start state in which a signal indicating the absolute value of a differentiation value of acceleration exceeds a given threshold value (from a stationary state) or is within a given range;

a low-gravity transition detection unit for detecting whether or not the fall detection device is in a period of transition or shift from the fall start state to a low gravity state in which the signal indicating the absolute value of acceleration is lower than a given threshold value or falls within a given range lower than a stationary state (gravitational acceleration applying state) within a given period of time; and a falling state detection unit for detecting a falling state in which the low gravity state continues for a given period of time or longer.

(3) In another embodiment of a fall detection device for detecting a fall on the basis of an output signal of an acceleration sensor, the fall detection device includes:

a fall start monitoring unit for monitoring whether or not the fall detection device is in a fall start state in which a signal indicating a differentiation value of the absolute value of acceleration is lower than a given negative threshold value (from a stationary state) in a negative direction or is within a given negative range;

a low-gravity transition detection unit for detecting whether or not the fall detection device is in a period of transition or shift from the fall start state to a low gravity state in which the signal indicating a differentiation value of the absolute value of acceleration is close to 0 relative to a given threshold value within a given period of time; and a falling state detection unit for detecting a falling state in which the low gravity state continues for a given period of time or longer.

(4) In another embodiment of a fall detection device for detecting a fall on the basis of an output signal of an acceleration sensor, the fall detection device includes:

a fall start monitoring unit for monitoring whether or not the fall detection device is in a fall start state in which a signal indicating the absolute value of a differentiation value of acceleration exceeds a given positive threshold value (from a stationary state) or is within a given range;

a low-gravity transition detection unit for detecting whether or not the fall detection device is in a period of transition or shift from the fall start state to a low gravity state in which the signal indicating the absolute value of the differentiation value of acceleration is close to 0 relative to a given threshold value within a given period of time; and a falling state detection unit for detecting a falling state in which the low gravity state continues for a given period of time or longer.

(5) In another embodiment, the fall detection device includes a unit for outputting a fall warning signal when the fall start monitoring unit detects the fall start state or when the low-gravity transition detection unit detects the transition to a low gravity state, and a unit for outputting a fall detection signal when the falling state detection unit detects the falling state.

(6) Another embodiment of the present invention includes a magnetic disk device having the fall detection device, wherein the magnetic disk device has a head for recording data onto or reading out data from a magnetic disk, and a head retracting unit for retracting the head to a retracting area when the fall detection device detects the fall start state, the low gravity state, or the falling state.

(7) Another embodiment of the present invention includes a portable electronic apparatus having the fall detection device and a device capable of taking a protective step in case of an impact, wherein the electronic apparatus has a measure against an impact for the device when the fall detection device detects the fall start state, the low gravity state, or the falling state.

According to the invention, the following effects are achieved:

(1) According to the invention of any one of embodiments (1) to (4) above, the monitoring, by the fall start monitoring unit, whether or not the fall detection device is in a fall start state in which a signal indicating a differentiation value of the absolute value of acceleration is lower than a given negative threshold value in a negative direction or is within a given negative range; the detection, by the low-gravity transition detection unit, whether or not the fall detection device is in a period of transition from the fall start state to a low gravity state in which a signal indicating the absolute value of acceleration is lower than a given threshold value or falls within a given range lower than a value of the stationary state within a given period of time; and the detection, by the falling state detection unit, of the continuation of a low gravity state for a given period of time or longer as a falling state, may be performed in succession in the time sequence mentioned above.

According to the aforementioned embodiments, it is not necessary to perform the determination simultaneously on the basis of a plurality of threshold values or the determination simultaneously on the basis of an acceleration and a differentiation value of the acceleration. In particular, problems arising when the determination is performed by software, e.g., the arithmetic load of CPU becomes large and the processing time is prolonged can be solved.

At a stage when the fall start monitoring unit detects a fall start state or at a stage when the low-gravity transition detection unit detects the transition to a low gravity state, the start of a fall is suspected, i.e., a fall can be predicted. Thus, a measure against the fall can be taken before the detection of the falling state is finally determined.

(2) According to the invention of aspect (3) or (4) above, both the low-gravity transition detection unit and the falling state detection unit perform the determination on the basis of a differentiation value of the absolute value of acceleration or the absolute value of the differentiation value similarly as the fall start monitoring unit, i.e., the value of acceleration is not used, and thus offset correction of the detection of acceleration becomes unnecessary.

When a device falls while rotating, the acceleration due to the centrifugal force of the rotation is added to a detection signal of acceleration. However, when the rotational speed is constant, a differentiation value of the detection signal of acceleration is not affected. Thus, the fall detection can be appropriately performed without being affected by the rotation.

(3) By outputting a fall warning signal when the fall start monitoring unit detects a fall start state or when the low-gravity transition detection unit detects the transition to a low gravity state, a processing for the prediction of a fall can be taken. Since a fall detection signal is output when the falling state detection unit detects a falling state, processings in accordance with a fall in two stages can be performed.

(4) By providing such a fall detection device in which a head is retracted to a retraction area when a fall is detected, a magnetic disk device can be protected. Moreover, since the likelihood of erroneous detection is lessened, a problem in that a response rate of the magnetic disk device reduces during use can be solved.

(5) A processing for preparing for the fall can be performed at the fall start state or at the low gravity state and, when the falling state is detected, a processing for the fall can be performed. Thus, a device capable of taking a measure against an impact is effectively controlled to increase safety of a portable electronic apparatus.

Various embodiments of the present invention are described below with reference to the accompanying drawings.

Figure 2:
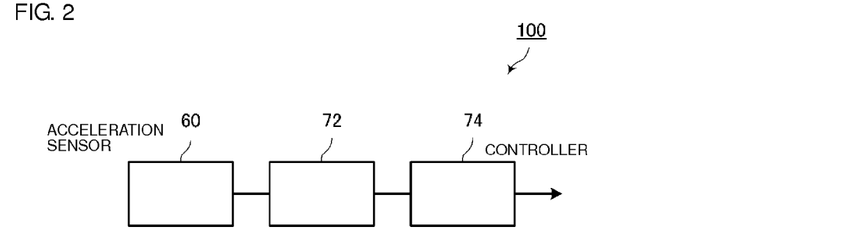
FIG. 2 is a block diagram of the structure of a fall detection device according to a first embodiment.

FIG. 2 is a block diagram of the structure of a fall detection device according to a first embodiment. A fall detection device 100 has an acceleration sensor 60 that detects an acceleration and outputs an analog voltage signal corresponding to the acceleration, an A/D converter 72 that converts the output voltage of the acceleration sensor 60 to digital data, and a controller 74 that detects a fall on the basis of the output data of the A/D converter 72, and then outputs the detection result to the outside (host device).

In order to detect a fall even when the falling direction is indefinite, an acceleration in the three dimensional direction is detected, and the fall detection is performed based thereon. In this case, specifically, the acceleration sensor 60 is constituted by three acceleration sensors that detect accelerations in the X axis direction, Y axis direction, and Z axis direction, respectively. The X, Y, and Z directions are orthogonal to each other. The A/D converter 72 converts the output voltage of each acceleration sensor to digital data in FIG. 2.

When determining the absolute value of acceleration, as described hereinafter, the controller 74 determines the absolute value |a| of acceleration a, which is a vector, by calculating $|a|=\sqrt{(ax^2+ay^2+az^2)}$ when the acceleration in each axis direction is represented by ax, ay, and az.

When only the acceleration in a given one direction may be simply determined, the absolute value a itself in the one direction may be used as the absolute value |a| of the acceleration a.

As the acceleration sensor, acceleration sensors of various types, such as a piezoelectric type, a piezoresistance type, and a capacitance type, can be used.

Figure 3:
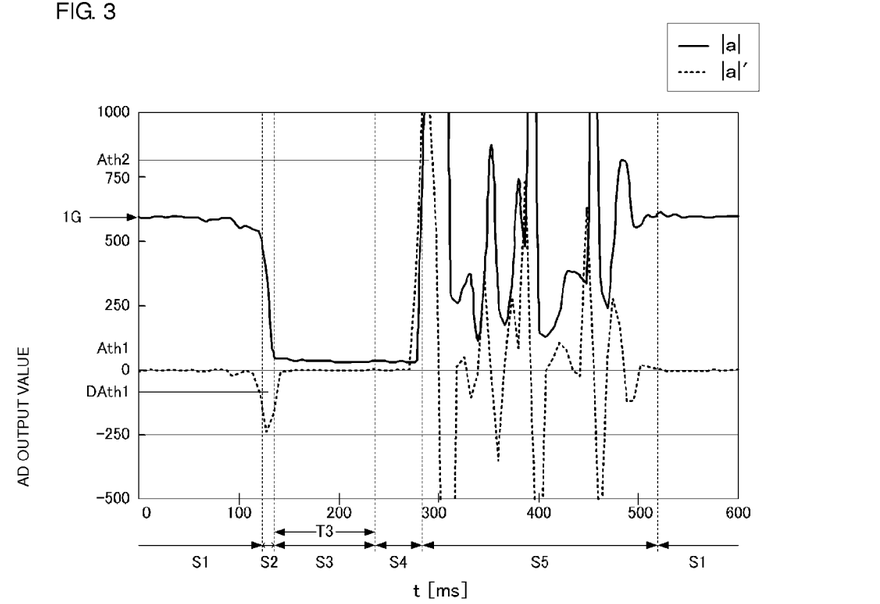
FIG. 3 is a diagram illustrating an example of changes in the absolute value of acceleration detected by an acceleration sensor of the fall detection device and a differentiation value thereof and a transition state of each stage of a first stage 51 to a fifth stage S5 determined on the basis of the acceleration and the differentiation value of the absolute value of the acceleration.

FIG. 3 illustrates an example of changes with time in acceleration applied to the fall detection device 100 before and after a fall and a differentiation value of the acceleration. Here, the axis of ordinates represents the absolute value |a| of acceleration and a differentiation value |a|' thereof. The absolute value |a| of acceleration is an output value of the A/D converter 72 and a differentiation value |a|' thereof is a difference value of the absolute value |a| of acceleration in unit time. The axis of abscissa represents an elapsed time t[ms].

The first stage S1 is a "Stationary state" in which a fall has not started. Therefore, the acceleration is a gravitational acceleration (=1G) and the output value of the A/D converter at this time is about 600. Since the absolute value |a| of acceleration is almost constant, a differentiation value |a|' thereof is approximately 0. When the fall starts at some point in time after that, the absolute value |a| of acceleration sharply decreases and the differentiation value |a|' thereof decreases in the negative direction.

When the differentiation value |a|' has become lower than a threshold value DAth1, it is considered that the fall detection device has entered a second stage S2 "Fall start state".

Thereafter, the fall detection device enters a low gravity state (gravity-free state) by a free movement, and the absolute value |a| of acceleration becomes approximately 0.

When the absolute value |a| of acceleration has become lower than a threshold value Ath1, it is considered that the fall detection device has entered a third stage S3 "Low gravity state". Although the absolute value |a| of acceleration decreases after that, the absolute value |a| of acceleration is not completely 0 as illustrated in FIG. 3 when the output of the acceleration sensor 60 has an offset.

When a given time T3 passes after the low gravity state starts, it is considered that the state has changed to a "Falling state". A fourth stage S4 is the "Falling state".

Thereafter, the fall detection device, which is mounted on an electronic apparatus, collides with the floor or the like, and thus the absolute value |a| of the acceleration of the fall detection device sharply increases. The absolute-value |a| of acceleration is sharply fluctuated when repeatedly bouncing or the like. A fifth stage S5 in FIG. 3 represents the "Fall impact state".

Thereafter, when the bouncing stops or when a person retrieves the electronic apparatus, the acceleration is stabilized, and the stage returns to the first stage S1 "Stationary state".

In the example illustrated in FIG. 3, a device is made to fall on a cushioning material. Thus, the fifth stage S5 continues for a relatively long period of time.

Figure 4:
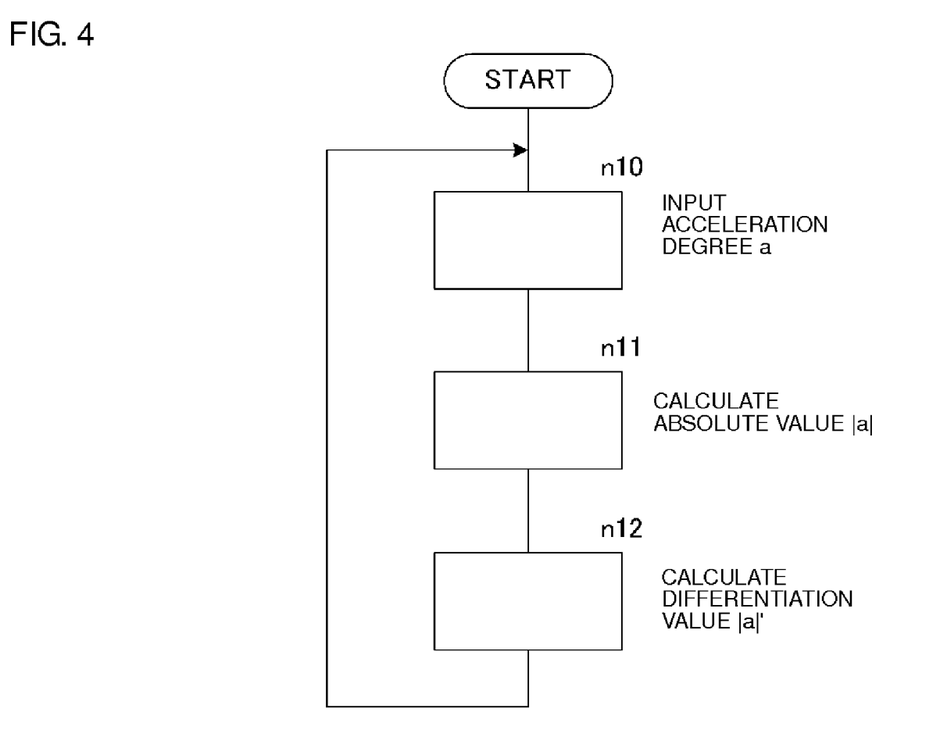
FIG. 4 is a flowchart partially illustrating a process performed by a controller.
Figure 5:
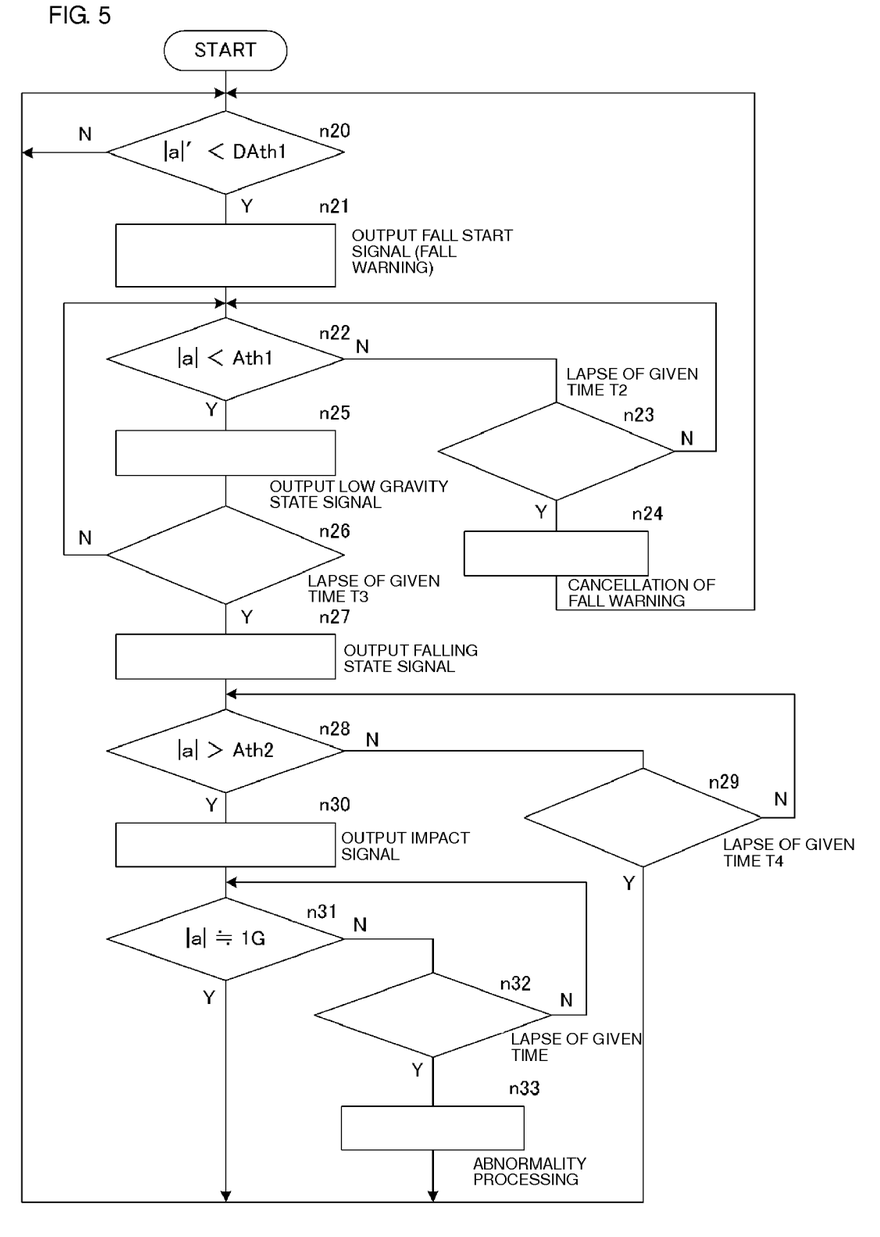
FIG. 5 is a flowchart illustrating a procedure for performing the determination of each stage using the absolute value of the acceleration and the differentiation value thereof.

The controller 74 illustrated in FIG. 2 detects a fall on the basis of the output value of the A/D converter 72 illustrated in FIG. 3. FIGS. 4 and 5 illustrate a procedure therefor as a flowchart.

FIG. 4 illustrates a procedure for generating, from the output of the acceleration sensor, data on the basis of which a fall is detected. First, the output value (i.e., acceleration value) of the A/D converter 72 is input (n10). Subsequently, the absolute value |a| thereof is calculated (n11). Furthermore, the differentiation value |a|' thereof is calculated (n12). The differentiation value |a|' is determined by, for example, calculating a difference between the absolute value |a| of the last acceleration and the absolute value |a| of the current acceleration. The processing illustrated in FIG. 4 is repeatedly performed for each sampling period.

FIG. 5 is a flowchart illustrating a procedure for detecting the stages of the first stage S1 to the fifth stage S5 illustrated in FIG. 3 on the basis of the absolute value of the acceleration and the differentiation value thereof and outputting various signals to the outside at a given stage.

First, it is determined whether or not the differentiation value |a|' of the absolute value of acceleration is lower than the threshold value DAth1 (n20). When the differentiation value |a|' is lower than the threshold value DAth1, a "Fall start signal" is output to the outside (host device) (n20→n21). The fall start signal is treated as a fall warning signal at the host device side. For example, in the case of a hard disk drive device, reading and writing are controlled to complete in order to prepare for head retraction.

The repetition of the step n20 refers to the first stage S1 "Stationary state" illustrated in FIG. 3. When the fall start signal is output, the fall detection device enters the second stage S2 "Fall start state" illustrated in FIG. 3.

The transition to the second stage may be determined on the basis of whether or not the differentiation value |a|' of the absolute value of acceleration falls within a given range lower than a value of the stationary state.

Thereafter, the process waits until the absolute value |a| of acceleration becomes lower than the threshold value Ath1 (n21→n22→n23→n22→ . . . ). When a given time T2 (for example, 50 ms) passes, and the absolute value |a| of the acceleration is not lower than the threshold value Ath1, it is considered that the acceleration temporarily decreases due to mere movement or handling of an electronic apparatus, and fall warning is canceled (n23→n24→n20). Thus, the process returns to the first stage S1 "Stationary state".

When the absolute value of acceleration becomes lower than the Ath1 within the given time T2, a "Low gravity state signal" is output (n22→n25).

The transition to the third stage may be determined on the basis of whether or not the absolute value |a| of acceleration falls within a given range lower than a value of the stationary state.

When the low gravity state continues for a given time T3, a "falling state signal" (n26→n27) is output. Thus, the fall detection device enters the fourth stage S4 "Falling state" illustrated in FIG. 3.

Thereafter, when the absolute value |a| of acceleration exceeds a threshold value Ath2, an "Impact signal" is output (n28→n30). Thus, the fall detection device enters the fifth stage "Fall impact state" illustrated in FIG. 3.

When the absolute value |a| of acceleration does not exceed the threshold value Ath2 after a given time T4 passes, it is considered that an impact is avoided beforehand, and then the state returns to the stationary state (n28→n29→n20).

When the absolute value of acceleration becomes substantially equal to the gravitational acceleration (=1G) after the impact signal is output, the state returns to the stationary state (n31→n20).

When the absolute value of acceleration is not close to the gravitational acceleration after a given time passes, an abnormality processing in which it is considered that the fall detection device has been in an abnormal state due to an impact, for example (n31→n32→n33).

Thus, in any stage of the stages S1 to S5 illustrated in FIG. 3, the determination is performed using only either one of the absolute value |a| of acceleration and the differentiation value |a|' thereof. Therefore, the arithmetic load of CPU decreases, and a period of time (unit time) required for a necessary calculation can be shortened. Accordingly, a sampling period can be shortened and, as a result, a fall detection device with a higher responsiveness can be realized.

In the first embodiment, each state has been determined on the basis of both the absolute value of acceleration and a differentiation value thereof, but not simultaneously using them in terms of timing. However, the same determination is performed only on the basis of a differentiation value of the absolute value of acceleration in a second embodiment of the present invention.

In the second embodiment of the present invention, the whole structure of the fall detection device is the same as that illustrated in FIG. 2 in the first embodiment. The calculation of the absolute value of acceleration and a differentiation value thereof are the same as the procedure illustrated in FIG. 4.

Figure 6:
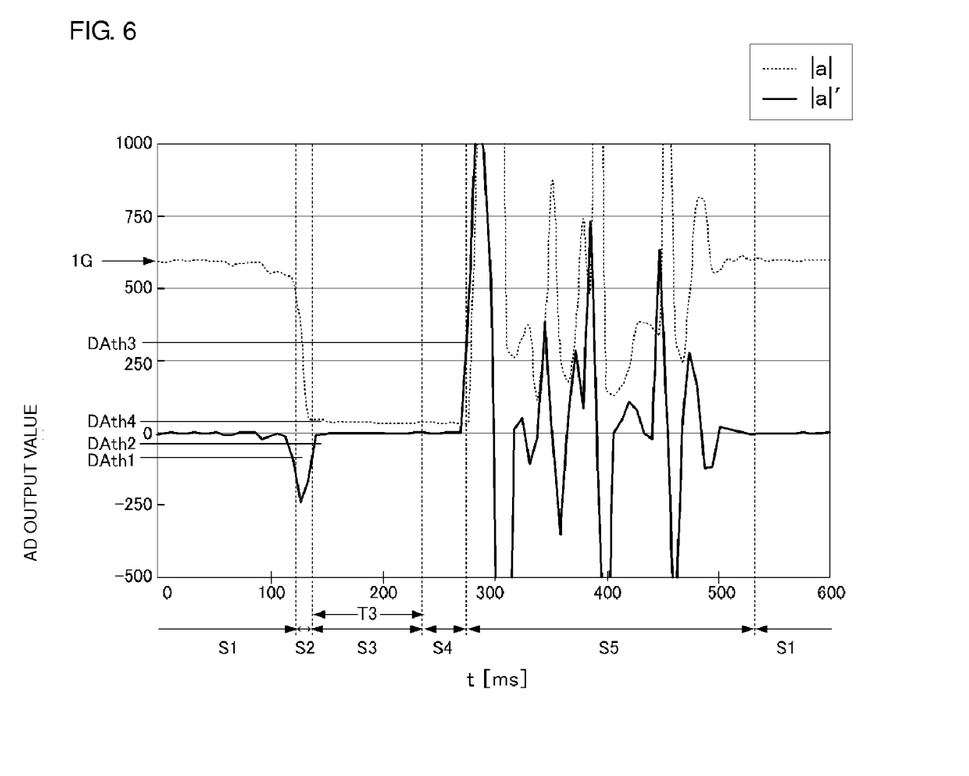
FIG. 6 is a diagram illustrating an example of changes in the absolute value of acceleration detected by an acceleration sensor of a fall detection device according to a second embodiment and a differentiation value thereof, and a transition state of each stage of a first stage S1 to a fifth stage S5 determined on the basis of the differentiation value of the absolute value of acceleration.

FIG. 6 illustrates an example of changes with time in an acceleration applied to a fall detection device according to the second embodiment before and after the fall of the device and a differentiation value of the acceleration. In FIG. 6, the axis of ordinates represents the absolute value |a| of acceleration and the differentiation value |a|' thereof. The absolute value |a| of acceleration is the output value of the A/D converter 72 and the differentiation value |a|' thereof is a difference value of the absolute value |a| of acceleration in unit time. The axis of abscissa represents an elapsed time t[ms]. In FIG. 6, the absolute value |a| of acceleration is represented, but the value is not compared with a certain threshold value.

When the differentiation value |a|' of the absolute value of acceleration has become lower than the threshold value DAth1 in FIG. 6, it is considered that the fall detection device enters the second stage S2 "Fall start state".

The transition to the second stage may be determined on the basis of whether or not the differentiation value |a|' of the absolute value of acceleration falls within a given range lower than a value of the stationary state.

Thereafter, when the |a|' has fallen within the range of the threshold values DAth2 to DAth4, it is considered that the fall detection device has entered the third stage S3 "Low gravity state". Thus, not by merely determining whether or not the |a|' has exceeded the threshold value DAth2 but by determining whether or not the |a|' has fallen within a given range, the oscillation of a device is not erroneously determined as a fall of the device.

When a fixed time T3 passes after the low gravity state starts, it is considered that the state has changed to the "Falling state". The fourth stage S4 is the "Falling state".

Thereafter, when the differentiation value |a|' of the absolute value of acceleration has exceeded the threshold value DAth3, it is considered that the fall detection device has entered the fifth stage S5 "Fall impact state".

Thereafter, when the |a|' has become approximately 0, it is considered that the fall detection device has entered the first stage "Stationary state".

Figure 7:
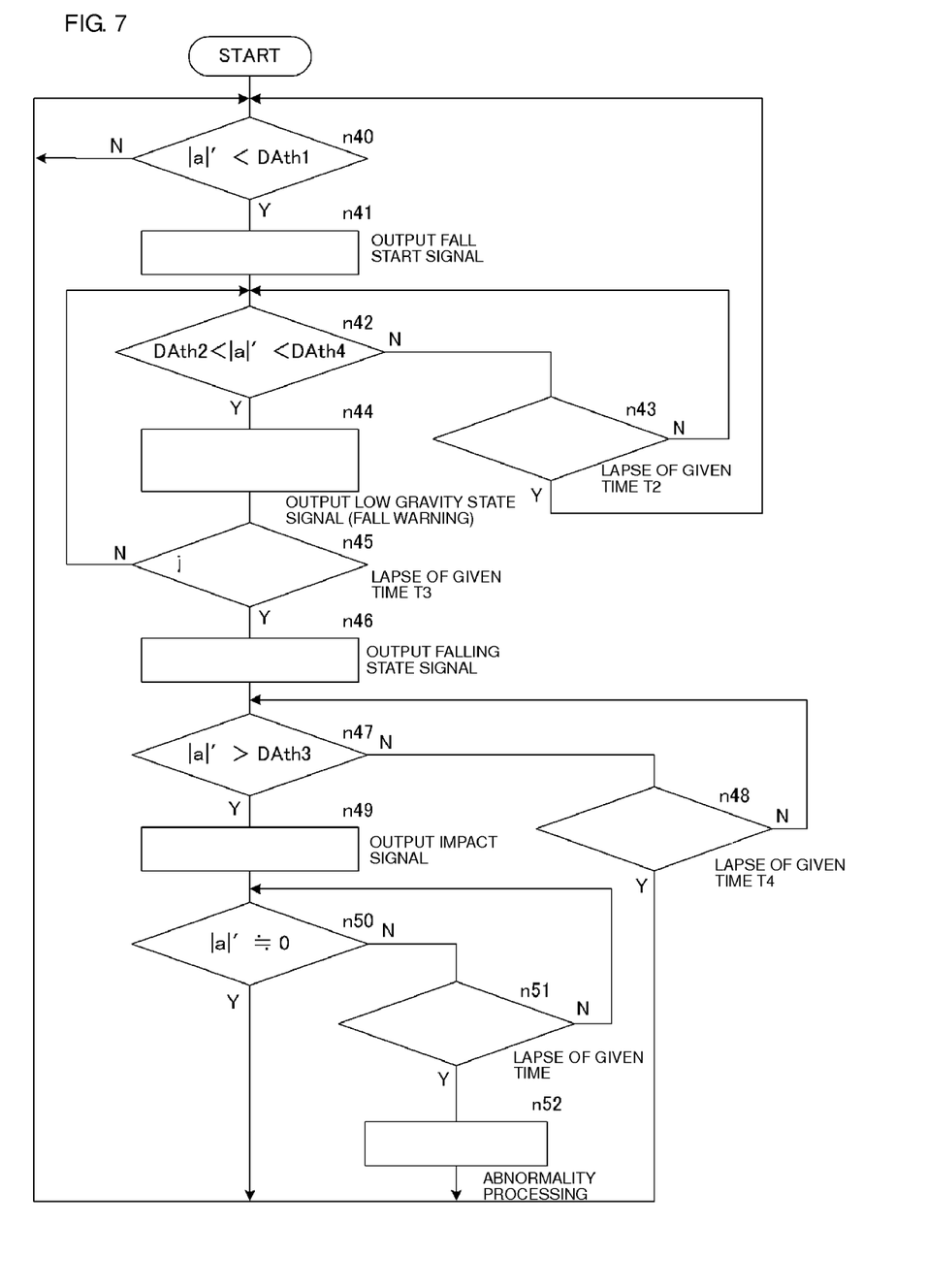
FIG. 7 is a flowchart illustrating a procedure for performing the determination of each stage using the differentiation value of the absolute value of the acceleration.

FIG. 7 is a flowchart illustrating a procedure for determining each stage on the basis of the differentiation value |a|' of the absolute value of acceleration.

First, it is determined whether the differentiation value |a|' of the absolute value of acceleration is lower than the threshold value DAth1 (n40). When the differentiation value |a|' is lower than the threshold value DAth1, a "Fall start signal" is output to the outside (n41).

The repetition of the step n40 refers to the first stage S1 "Stationary state" illustrated in FIG. 6. When the fall start signal is output, the fall detection device enters the second stage S2 "Fall start state" illustrated in FIG. 6.

Thereafter, the process waits until the differential value |a|' of the absolute value of acceleration falls within the range of the threshold values DAth2 to DAth4 (n42→n43→n42→ . . . ). When a given time T2 (for example, 50 ms) passes, and the |a|' does not fall within the range of the threshold values DAth2 to DAth4, it is considered that the acceleration temporarily decreases due to mere movement or handling of an electronic apparatus, and then the state returns to the "Stationary state" (n43→n40).

When the |a|' has exceeded the DAth2 within the given time T2, a "Low gravity state signal" is output (n44). When the state continues for a given time T3, a "falling state signal" is output (n45→n46). Thus, the fall detection device enters the fourth stage S4 "Falling state" illustrated in FIG. 6.

Thereafter, when the differentiation value |a|' of the absolute value of acceleration has exceeded the threshold value DAth3, an "Impact signal" is output (n47→n49). Thus, the fall detection device enters the fifth stage "Fall impact state" illustrated in FIG. 6.

When the |a|' does not exceed the threshold value DAth3 after a given time T4 passes, it is considered that an impact is avoided beforehand, and then the state returns to the stationary state (n48→n40).

When the differential value |a|' of the absolute value of acceleration becomes approximately 0 after the impact signal is output, the state returns to the stationary state (n50→n40).

When the |a|' is not close to 0 after a given time passes, an abnormality processing is performed and it is considered that the fall detection device has been in an abnormal state due to an impact, for example (n51→n52).

Thus, the determination of each stage is performed using only the differentiation value |a|' of the absolute value of acceleration, and necessary signals are output.

In the second embodiment, each state is determined on the basis of a differentiation value of the absolute value of acceleration. In a third embodiment, the same determination is performed on the basis of the absolute value of a differentiation value of acceleration. The whole structure of the fall detection device is the same as that illustrated in FIG. 2 in the first embodiment.

The absolute value of a differentiation value of acceleration is determined as follows. First, the output value (acceleration value) of the A/D converter 72 is input, and a differentiation value a' thereof is calculated. The differentiation value a' is determined by, for example, calculating a difference between the last acceleration and the current acceleration. Then, when a differentiation value of acceleration in each axis direction is represented by ax', ay', and az', the absolute value |a'| of a differentiation value of acceleration is determined by calculating $|a'|=\sqrt{(ax'^2+ay'^2+az'^2)}$. The processing is repeatedly performed for each sampling period.

Figure 8:
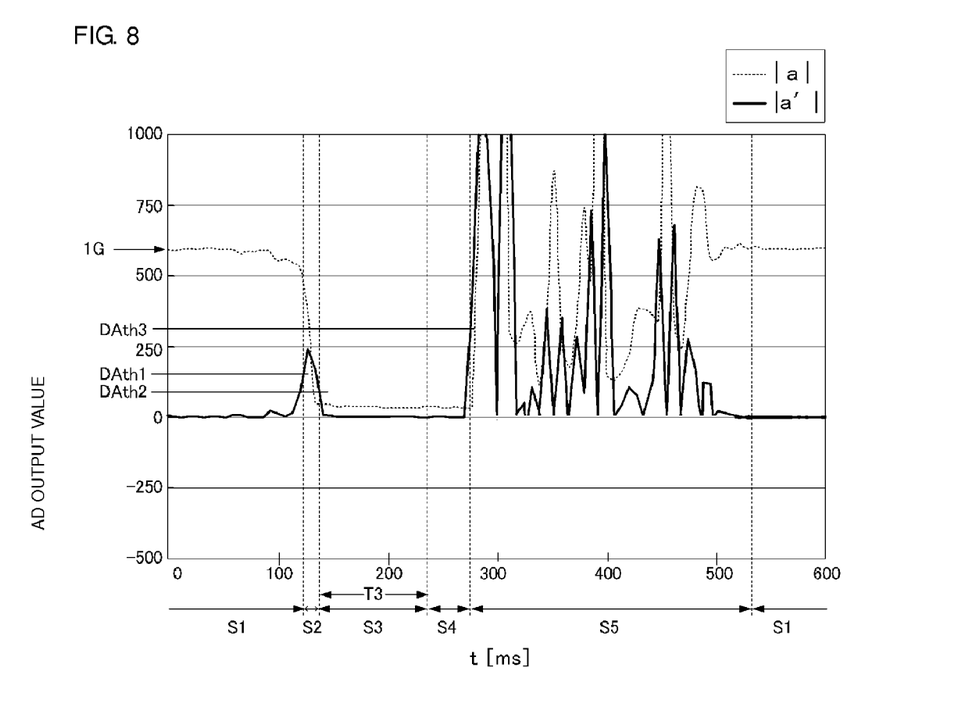
FIG. 8 is a diagram illustrating an example of changes in the absolute value of acceleration detected by an acceleration sensor of a fall detection device according to a third embodiment and the absolute value of a differentiation value of acceleration and a transition state of each stage of a first stage S1 to a fifth stage S5 determined on the basis of the absolute value of the differentiation value of acceleration.

FIG. 8 illustrates an example of changes with time in the absolute value of acceleration detected by an acceleration sensor of the fall detection device according to the third embodiment and the absolute value of the differentiation value of the acceleration and the transition state of each stage of the first stage S1 to the fifth stage S5 determined on the basis of the absolute value of the differentiation value of the acceleration.

In FIG. 8, the axis of ordinates represents the absolute value |a| of acceleration and the absolute value |a'| of a differentiation value of acceleration. The axis of abscissa represents an elapsed time t[ms]. In FIG. 8, the absolute value |a| of acceleration is represented, but the value is not compared with a certain threshold value.

When the absolute value |a'| of a differentiation value of acceleration has exceeded the threshold value DAth1 in FIG. 8, it is considered that the fall detection device enters the second stage S2 "Fall start state". The transition to the second stage may be determined on the basis of whether or not the absolute value |a'| of a differentiation value of acceleration falls within a given range higher than the stationary state.

Thereafter, when the |a'| has become lower than the threshold value DAth2, it is considered the fall detection device has entered the third stage S3 "Low gravity state". The transition to the second stage may be determined on the basis of whether or not the absolute value |a'| of a differentiation value of acceleration falls within a given range.

Thus, by performing the comparison between the |a'| and the threshold value based on the determination whether or not the |a'| has fallen within a given range, the oscillation of a device is not erroneously determined as a fall of the device.

When a fixed time T3 passes after the low gravity state starts, it is considered that the state has changed to the "Falling state". The fourth stage S4 is the "Falling state".

Thereafter, when the absolute value |a'| of a differentiation value of acceleration has exceeded the threshold value DAth3, it is considered that the fall detection device has entered the fifth stage S5 "Fall impact state".

Thereafter, when the |a'| has become approximately 0, it is considered that the fall detection device has entered the first stage "Stationary state".

Figure 9:
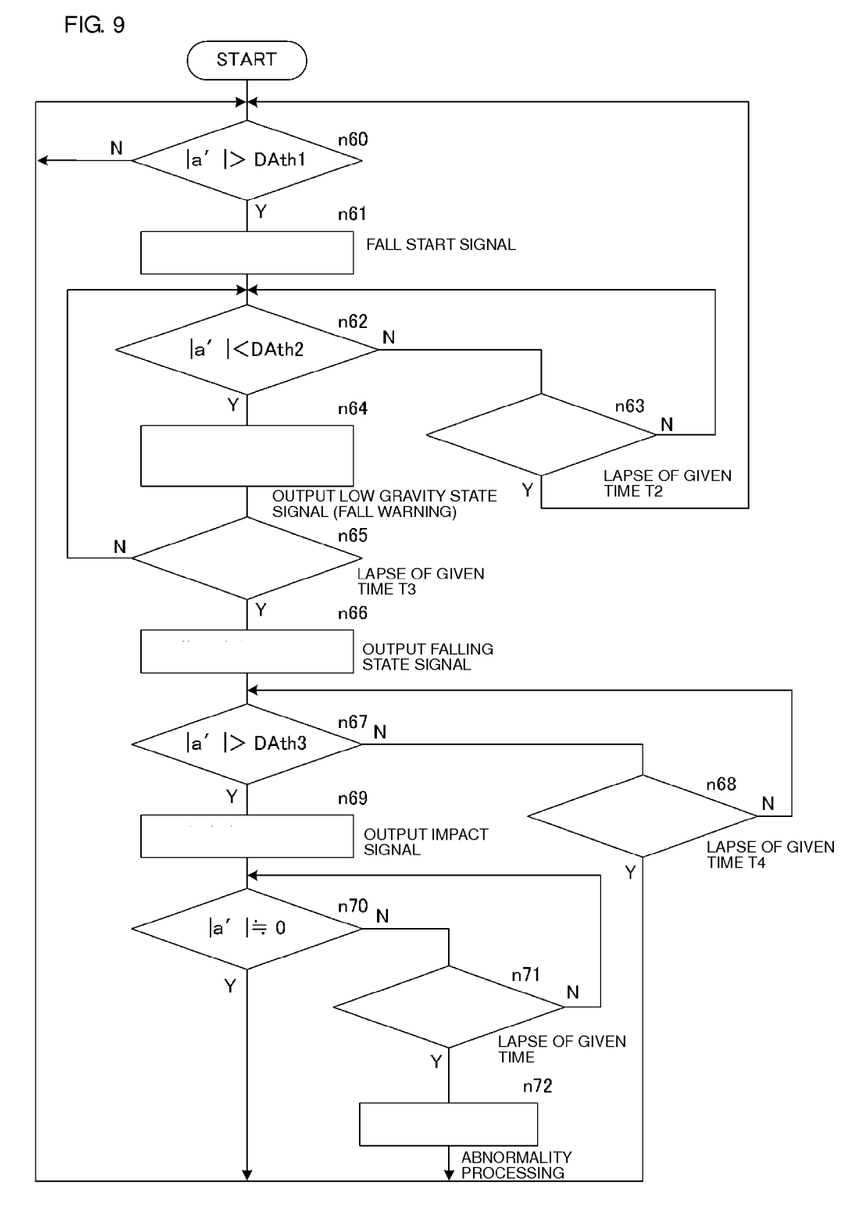
FIG. 9 is a flowchart illustrating a procedure for performing the determination of each stage using the absolute value of the differentiation value of acceleration of the fall detection device according to the third embodiment.

FIG. 9 is a flowchart illustrating a procedure for determining each stage using the absolute value of a differentiation value of acceleration of the fall detection device according to the third embodiment.

First, it is determined whether the absolute value |a'| of a differentiation value of acceleration exceeds the threshold value DAth1 (n60). When the |a'| exceeds the threshold value DAth1, a "Fall start signal" is output to the outside (n61).

The repetition of the step n60 refers to the first stage S1 "Stationary state" illustrated in FIG. 8. When the fall start signal is output, the fall detection device enters the second stage S2 "Fall start state" illustrated in FIG. 6.

Thereafter, the process waits until the absolute value |a'| of a differentiation value of acceleration is lower than the threshold value DAth2 (n62→n63→n62→ . . . ). When a given time T2 (for example, 50 ms) passes, and the |a'| is not lower than the threshold value DAth2, it is considered that the acceleration temporarily decreases due to mere movement or handling of an electronic apparatus, and then the states returns to the "Stationary state" (n63→n60).

When the |a'| has become lower than the DAth2 within the given time T2, a "Low gravity state signal" is output (n64). When the state continues for a given time T3, a "falling state signal" is output (n65→n66). Thus, the fall detection device enters the fourth stage S4 "Falling state" illustrated in FIG. 8.

Thereafter, when the absolute value |a'| of a differentiation value of acceleration exceeds the threshold value DAth3, an "Impact signal" is output (n67→n69). Thus, the fall detection device enters the fifth stage S5 "Fall impact state" illustrated in FIG. 8.

When the |a'| does not exceed the threshold value DAth3 after a given time T4 passes, it is considered that an impact is avoided beforehand, and then the state returns to the stationary state (n68→n60).

When the absolute value |a'| of a differentiation value of acceleration becomes approximately 0 after the impact signal is output, the state returns to the stationary state (n70→n60).

When the |a'| is not close to 0 after a given time passes, an abnormality processing is performed in which it is considered that the fall detection device has been in an abnormal state due to an impact, for example (n71→n72).

Thus, the determination of each stage is performed using only the absolute value |a'| of a differentiation value of acceleration, and necessary signals are output.

Thus, in the third embodiment, "the differentiation value of the absolute value of acceleration" in the second embodiment is replaced by "the absolute value of the differentiation value of acceleration" and the absolute value is compared with the threshold value according thereto. However, "the differentiation value of the absolute value of acceleration" illustrated in the first embodiment may be similarly replaced by "the absolute value of the differentiation value of acceleration". In such a case, the determination of the step n20 illustrated in FIG. 5 may be replaced by the determination of "|a'|>DAth1".

Figure 10:
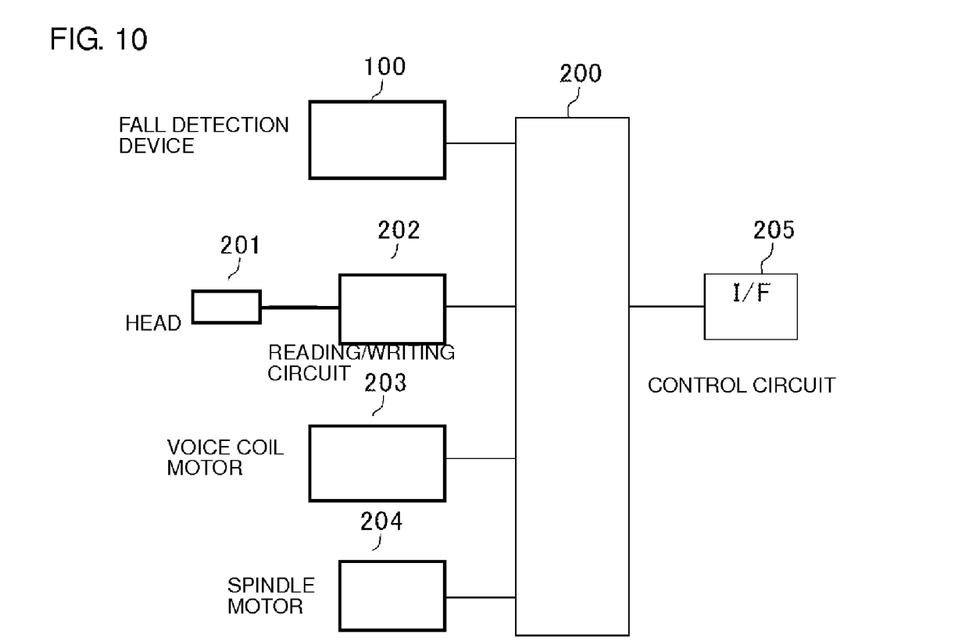
FIG. 10 is a block diagram of the structure of a magnetic disk device according to a fourth embodiment.

FIG. 10 is a block diagram of the structure of a magnetic disk device in a fourth embodiment, such as a hard disk drive device. Here, a reading/writing circuit 202 reads or writes data written on a track on a magnetic disk using a head 201. A control circuit 200 controls the reading/writing of data via a reading/writing circuit 202, and communicates the read/written data with a host device through an interface 205.

The control circuit 200 also controls a spindle motor 204 and a voice coil motor 203. The control circuit 200 reads out the fall detection signal by the fall detection device 100, and, in a falling state, controls the voice coil motor 203 to retract the head 201 to a retraction area. Thus, the head is retracted from the area of the magnetic disk to the retraction area by the time when, for example, a portable device, on which a hard disk device is mounted, collides with the floor or the ground surface when the portable device is made to fall. Accordingly, breakage due to contact with the recording surface of the magnetic disk and the head 201 can be prevented.

Figure 11:
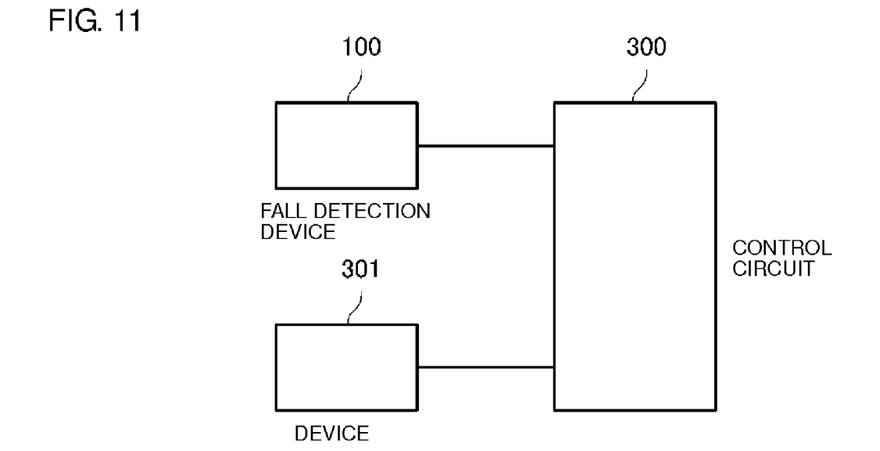
FIG. 11 is a block diagram of the structure of a portable electronic apparatus according to a fifth embodiment.

FIG. 11 is a block diagram of the structure of a portable electronic apparatus according to a fifth embodiment, such as a notebook computer or a music/image reproducing device containing a hard disk drive device therein.

As shown in the fifth embodiment, the structure of the fall detection device 100 is as described in the first and second embodiments. A device 301 is a device that is required to be protected from an impact of collision at the time of falling and is capable of taking a measure thereagainst. For example, a hard disk drive device is mentioned. A control circuit 300 controls the device 301 on the basis of an output signal of the fall detection device 100. For example, when the control circuit 300 receives a fall warning signal (i.e., a fall start signal or a low gravity state signal) from the fall detection device 100, the control circuit 300 performs the control of a preliminary first stage for preparing for the impact at the time of falling to the device 301.

When the control circuit 300 receives a signal (i.e., a falling state signal) indicating that a device is in a falling state, the control circuit 300 performs the control of a second stage for preparing for the impact at the time of falling to the device 301.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A fall detection device for detecting a fall on the basis of an output signal of an acceleration sensor, the fall detection device comprising:
    a fall start monitoring unit configured to monitor and determine whether or not the fall detection device is in a fall start state in which a signal indicating the absolute value of a differentiation value of acceleration exceeds a given threshold value or is within a given range;
    a low-gravity transition detection unit configured to detect whether or not the fall detection device is in a period of transition from the fall start state to a low gravity state in which the signal indicating the absolute value of a differentiation value of acceleration is close to 0 relative to a given threshold value within a given period of time; and
    a falling state detection unit configured to detect a falling state in which the low gravity state continues for a given period of time or longer.

2. The fall detection device according to claim 1, further comprising:
    a unit to output a fall warning signal when the fall start monitoring unit detects the fall start state or when the low-gravity transition detection unit detects the transition to a low gravity state; and
    a unit to output a fall detection signal when the falling state detection unit detects the falling state.

3. A magnetic disk device, comprising:
    the fall detection device according to claim 1;
    a head to record data onto or read data from a magnetic disk; and
    a head retracting unit to retract the head to a retracting area when the fall detection device detects one of the fall start state, the low gravity state, and the falling state.

4. A portable electronic apparatus, comprising:
    the fall detection device according to claim 1; and
    a device capable of taking a measure against an impact when the fall detection device detects one of the fall start state, the low gravity state, and the falling state.

* * * * *